US012809949B2

(12) United States Patent
Miura et al.

(10) Patent No.: US 12,809,949 B2

(45) Date of Patent: Nov. 24, 2026

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Naritomo Miura, Miyoshi (JP); Shinya Miyasaka, Okazaki (JP); Naoki Ishihara, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/955,108

(22) Filed: Nov. 21, 2024

(65) Prior Publication Data

US 2025/0265316 A1 Aug. 21, 2025

(30) Foreign Application Priority Data

Feb. 19, 2024 (JP) ................................ 2024-022791

(51) Int. Cl.
*G06F 21/12* (2013.01)
*G06F 21/64* (2013.01)

(52) U.S. Cl.
CPC .................................. *G06F 21/12* (2013.01)

(58) Field of Classification Search
CPC ................................ G06F 21/12; G06F 21/64
See application file for complete search history.

(56) References Cited

U.S. PATENT DOCUMENTS

| | | | | |
|---|---|---|---|---|
| 11,631,208 | B1 * | 4/2023 | Khirman | G06N 3/088 382/100 |
| 2019/0332966 | A1 * | 10/2019 | Gidney | G06F 16/906 |
| 2023/0034519 | A1 * | 2/2023 | Ahmed | H04L 9/50 |
| 2023/0169709 | A1 * | 6/2023 | Im | G06F 3/04842 382/100 |
| 2023/0328039 | A1 * | 10/2023 | Wang | G06F 21/32 726/26 |
| 2023/0370274 | A1 * | 11/2023 | Chen | H04L 9/3236 |
| 2024/0104168 | A1 * | 3/2024 | Lara | G06N 3/045 |
| 2024/0220966 | A1 * | 7/2024 | Alva | H04L 9/3239 |
| 2024/0420124 | A1 * | 12/2024 | Ramde | G06Q 20/3674 |
| 2025/0104047 | A1 * | 3/2025 | Mashkevich | G06Q 20/3672 |
| 2025/0200334 | A1 * | 6/2025 | Dialani | G06Q 40/04 |

FOREIGN PATENT DOCUMENTS

| | | | |
|---|---|---|---|
| JP | 2022-511393 | A | 1/2022 |
| WO | 2020/083822 | A1 | 4/2020 |
| WO | 2023069050 | A1 | 4/2023 |

OTHER PUBLICATIONS

Itakura, "Practical Responses to Regulations for Services Incorporating Artificial Intelligence Including Large-Scale Language Models (LLM) in Japan and Europe", Computer Security Symposium 2023, pp. 1428-1434, Oct. 23, 2023; relevance discussed in Office Action issued in Japanese patent application JP 2024-022791 on Aug. 4, 2026 (see, e.g., NPL2).

Office Action issued in Japanese counterpart application JP 2024-022791 on Aug. 4, 2026.

* cited by examiner

*Primary Examiner* — Darren B Schwartz

(74) *Attorney, Agent, or Firm* — SoraIP, Inc.

(57) ABSTRACT

The disclosure relates to an information processing device. The information processing device includes: an acquisition unit that acquires information on artificial data generated by a generative AI constructed by machine learning using user data including information capable of specifying an individual; and a generation unit that generates a transaction including information on artificial data.

11 Claims, 2 Drawing Sheets

INFORMATION PROCESSING DEVICE AND INFORMATION PROCESSING METHOD

CROSS-REFERENCE TO RELATED APPLICATION

This application claims priority to Japanese Patent Application No. 2024-022791 filed on Feb. 19, 2024, incorporated herein by reference in its entirety.

BACKGROUND

1. Technical Field

The present disclosure relates to the technical field of information processing devices and information processing methods.

2. Description of Related Art

There is proposed a device that divides data into sensitive data and non-sensitive data and that provides the non-sensitive data to a distributed ledger, for example (see Japanese Unexamined Patent Application Publication (Translation of PCT Application) No. 2022-511393 (JP 2022-511393 A)).

SUMMARY

The behavior of a learned model constructed through machine learning is occasionally verified. This verification is often performed after a certain period of time has elapsed since the learned model was constructed. Although learning data used for the machine learning for constructing the learned model are used for the verification, there is a possibility that the reliability of the learning data is not guaranteed. JP 2022-511393 A does not consider the verification of the behavior of the learned model.

The present disclosure has been made in view of the above circumstances, and an object of the present disclosure is to provide an information processing device and an information processing method that can ensure the reliability of learning data.

An aspect of the present disclosure provides an information processing device including: an acquisition unit that acquires information about artificial data generated by a generative artificial intelligence (AI) built through machine learning using user data including information that enables personal identification, the artificial data not including information that enables personal identification; and a generation unit that generates a transaction including information about the artificial data.

An aspect of the present disclosure provides an information processing method including: acquiring information about artificial data generated by a generative artificial intelligence (AI) built through machine learning using user data including information that enables personal identification, the artificial data not including information that enables personal identification;

generating a transaction including information about the artificial data; and storing the transaction in a distributed ledger.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 2:
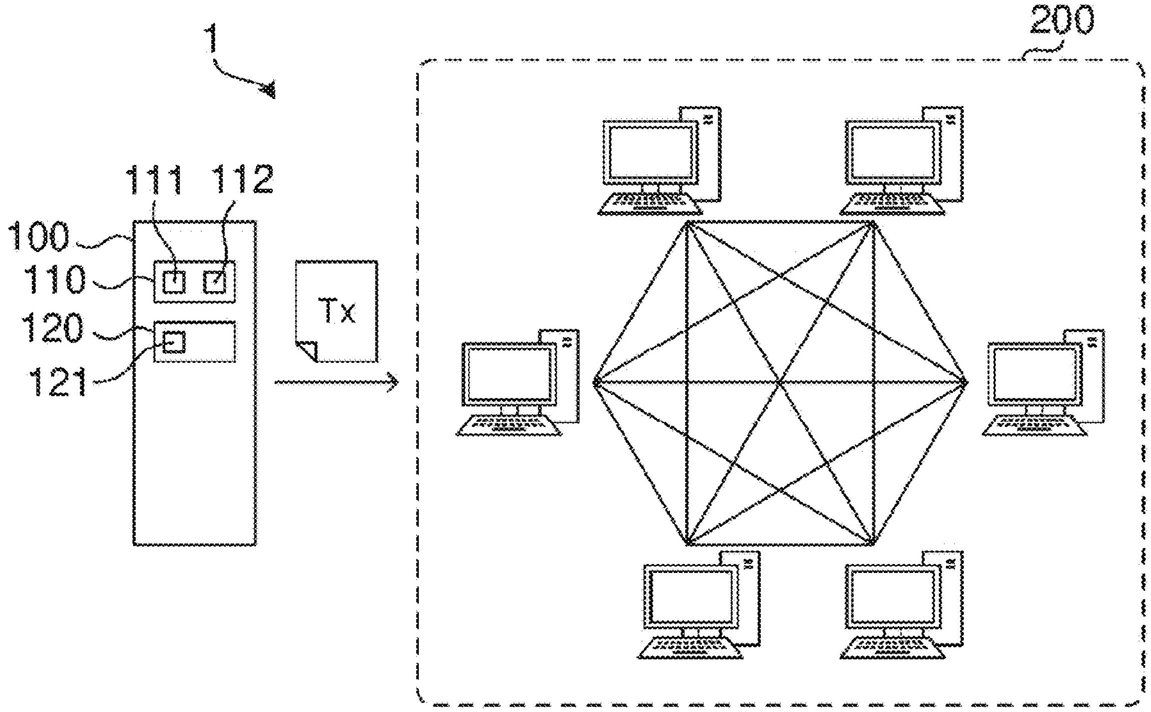
FIG. 2 is a block diagram illustrating a configuration of an information processing system according to an embodiment.
Figure 3:
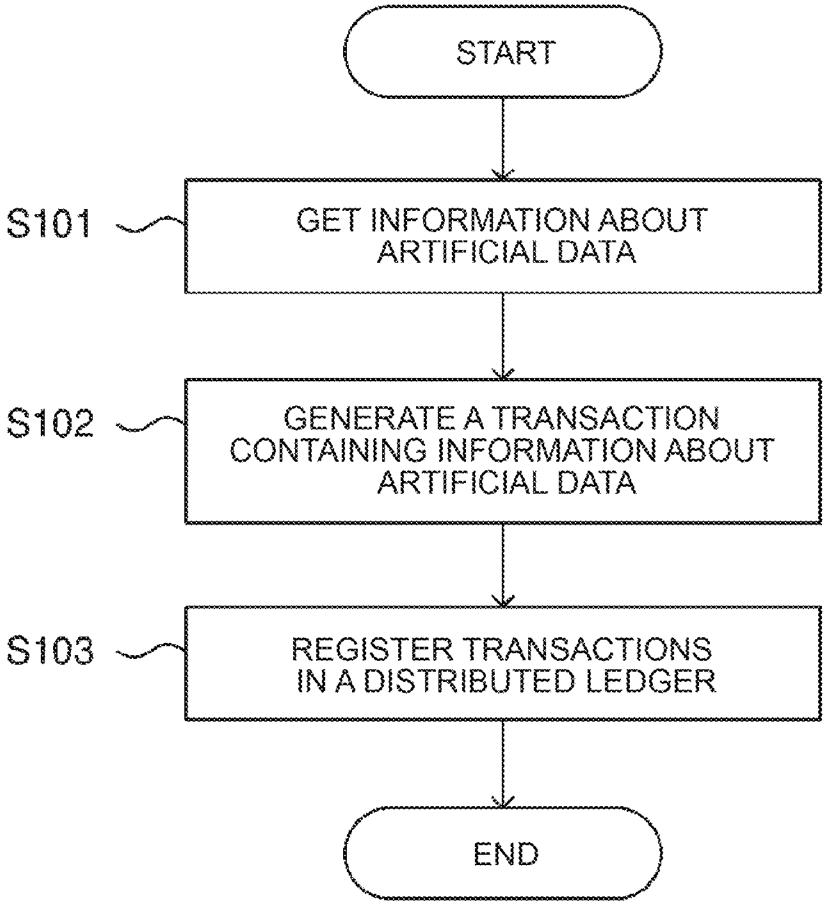
FIG. 3 is a flowchart illustrating an operation of the information processing system according to the embodiment.

Embodiments of an information processing device and an information processing method will be described with reference to FIGS. 1 to 3.

First, an example of machine learning will be described with reference to FIG. 1. In FIG. 1, user data is registered in the database DB. Here, at least a part of the user data may be data including information capable of specifying an individual. The user data may be, for example, image data including a face of the user. That is, the user data may be image data related to an image in which the face of the user is captured. Such user data may be generated, for example, by capturing an image of a person riding on the vehicle by a camera (for example, a driver monitor camera) that captures an image of the inside of the vehicle.

The generation device 10 includes a generative AI (Artificial Intelligence) 11. The generative AI 11 is a generative AI constructed by performing training using user data (typically a plurality of user data) registered in the database DB. It is to be noted that various aspects of the present disclosure can be applied to methods of constructing a generative AI 11. Therefore, detailed explanation of how to construct the generative AI 11 will be omitted. Note that the generative AI 11 may be constructed by fine tuning in which a pre-learned model (for example, a base model) is re-learned using user data.

The generation device 10 may receive an instruction from an operator of the generation device 10. The instruction by the operator may be represented by textual information. The generation device 10 may enter an instruction from the operator into the generative AI 11. generative AI 11 instructed by the operator is inputted may generate an artificial datum according to the instruction. That is, the generation device 10 may generate artificial data using the generative AI 11.

For example, when the user data is image data including the face of the user, the generative AI 11 learned by using the user data may be capable of generating new image data including the face as the artificial data. For example, when the instruction of the operator is "a face of a woman in her 70s", the generative AI 11 may generate image data including a face of an imaginary woman in her 70s as the artificial data. For example, when the instruction of the operator is "a face of a man in his/her twenties", the generative AI 11 may generate image data including a face of an imaginary man in his/her twenties as the artificial data. Note that the generative AI may generate one artificial data or a plurality of artificial data for one instruction of the operator.

For example, the image data including the face of the user corresponds to personal information. Therefore, it can be said that the image data including the face of the user as the user data includes information capable of specifying the individual. On the other hand, the image data generated by the generative AI 11 and including the face of the fictional person does not correspond to the information that can identify the individual. Therefore, it can be said that the artificial data is data that does not include information capable of specifying an individual. As described above, by generating artificial data using the generative AI 11, it is possible to generate a large amount of data that does not include information capable of identifying individuals.

The learning device 20 includes an arithmetic model 21. The arithmetic model 21 is a model before machine learning is performed (for example, a model in which weighting is not optimized). The learning device 20 may learn the arithmetic model 21 using artificial data (typically, a plurality of artificial data) generated by the generation device 10 (specifically, the generative AI 11). Note that various existing aspects can be applied to the learning method of the arithmetic model 21. Therefore, detailed description of the learning method of the arithmetic model 21 will be omitted.

Next, the information processing system 1 according to the embodiment will be described with reference to FIG. 2 and FIG. 3. In FIG. 2, the information processing system 1 includes an information processing device 100 and a distributed network 200 including a plurality of nodes. The information processing device 100 may be, for example, a server apparatus such as an application server or a terminal apparatus such as a personal computer.

The information processing system 1 registers information on artificial data used for machine learning of the arithmetic model 21 in a distributed ledger (for example, a blockchain) realized by the distributed network 200. For example, the information processing system 1 may function as a database related to artificial data.

The information processing device 100 may include an arithmetic device 110 and a storage device 120. The arithmetic device 110 may include, for example, at least one of CPU (Central Processing Unit) and GPU (Graphics Processing Unit). The storage device 120 may include, for example, at least one of RAM (Random Access Memory) and ROM (Read Only Memory). The storage device 120 may include, for example, at least one of a hard disk device, a magneto-optical disk device, an SSD (Solid State Drive), and an optical disk array. That is, it can be said that the information processing device 100 includes at least one processor and at least one memory.

The storage device 120 may store a computer program 121. The arithmetic device 110 may execute processing to be performed by the information processing device 100 together with the storage device 120 in which the computer program 121 is stored (in other words, together with the storage device 120 and the computer program 121 stored in the storage device 120). For example, a logical functional block for executing a process to be performed by the information processing device 100 may be realized in the arithmetic device 110 by the arithmetic device 110 executing the computer program 121. For example, the arithmetic device 110 may include an acquisition unit 111 and a generation unit 112 as functional blocks.

Figure 1:
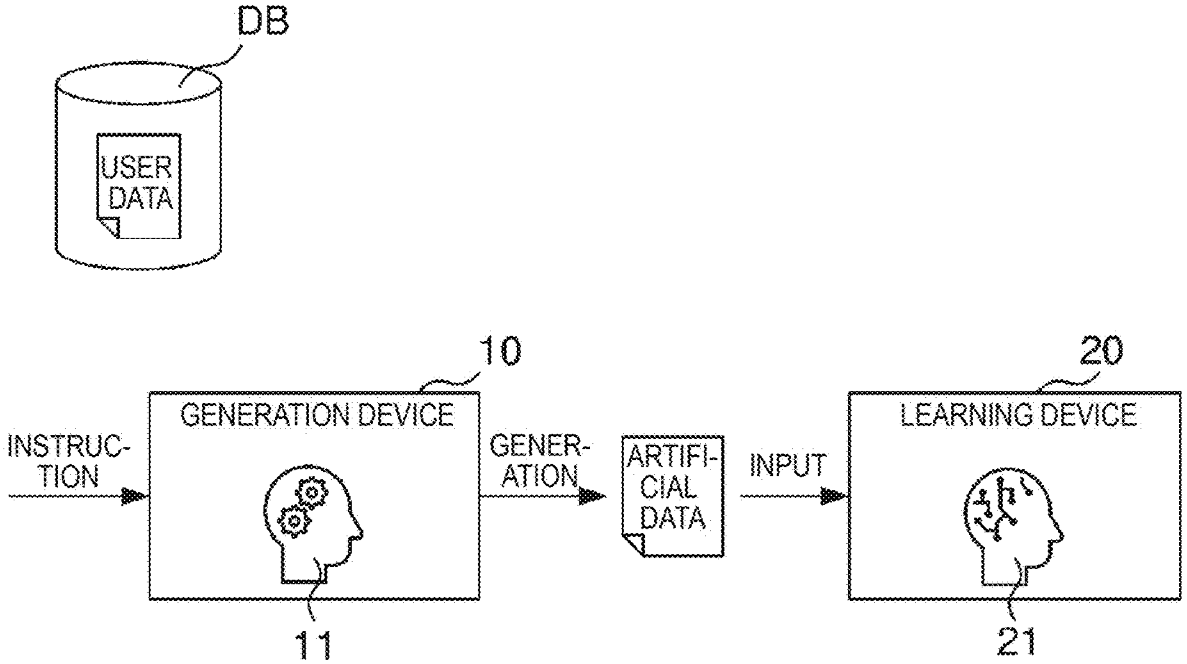
FIG. 1 is a conceptual diagram illustrating an example of machine learning.

The acquisition unit 111 of the arithmetic device 110 acquires information related to artificial data from the generation device 10 (see FIG. 1). The information on the artificial data may be, for example, artificial data itself, information for identifying the artificial data, information for specifying the artificial data, or information indicating the location of the artificial data.

An example of information for identifying artificial data is a hash value generated from artificial data. An example of information for specifying artificial data is a file name related to artificial data. Examples of the information indicating the location of the artificial data include information (for example, Uniform Resource Locator: URL) indicating the location where the artificial data is recorded.

The generation unit 112 of the arithmetic device 110 generates a transaction including information related to artificial data. The arithmetic device 110 may transmit the generated transaction to the distributed network 200. At least one node constituting the distributed network 200 may verify a transaction transmitted from the information processing device 100, and then register the transaction in the distributed ledger.

When the information related to the artificial data is the artificial data itself, the arithmetic device 110 may generate a transaction including the artificial data. In this case, the artificial data is registered in the distributed ledger. When the information on the artificial data is not the artificial data itself (for example, when the information on the artificial data is a hash value generated from the artificial data), the artificial data may be stored in the storage device 120 of the information processing device 100, for example. Alternatively, the information processing system 1 may include a device that stores artificial data different from the information processing device 100.

Next, the operation of the information processing system 1 will be described with reference to the flowchart of FIG. 3. In FIG. 3, the acquisition unit 111 of the arithmetic device 110 of the information processing device 100 acquires information related to artificial data from the generation device 10 (S101). Next, the generation unit 112 of the arithmetic device 110 generates a transaction including information related to artificial data (S102). The arithmetic device 110 may then transmit the transaction to the distributed network 200. At least one node of the distributed network 200 may register the transaction into a distributed ledger (S103).

Technical Effect

By performing machine learning of the arithmetic model (for example, the arithmetic model 21), the behavior of the learned model may be verified after the learned model is constructed. For verification, learning data used for machine learning of the arithmetic model is used.

By the way, a service provider may collect user data after obtaining the user's consent. The operator may perform machine learning of the arithmetic model by using the collected user data as learning data. On the other hand, the user can request the operator to delete the user data collected by the operator (in other words, provided by the user). When at least a part of the user data as the learning data is deleted in accordance with the user data deletion request, it may be difficult to verify the behavior of the learned model.

On the other hand, in the present embodiment, the machine learning of the arithmetic model 21 is performed using the artificial data generated by the generation device 10 (specifically, the generative AI 11). That is, the user data registered in the database DB is not used for the machine learning of the arithmetic model 21. Therefore, artificial data is used to verify the behavior of the learned model constructed by performing the machine learning of the arithmetic model 21. Therefore, even if the user data registered in the database DB is deleted due to the user data deletion request, the behavior of the learned model using the artificial data is not verified.

In the present embodiment, in particular, information on artificial data used for machine learning of the arithmetic model 21 is registered in the distributed ledger. It is extremely difficult to falsify the information on the artificial data registered in the distributed ledger. Therefore, by referring to the information on the artificial data registered in the distributed ledger, it is possible to detect the altered artificial data even if the artificial data is altered. For example, if the artificial data itself is registered in the distributed ledger as the information on the artificial data, it is possible to suppress the artificial data being altered. That is, according to the present embodiment, it is possible to suppress a decrease in the reliability of the artificial data.

As described above, according to the present embodiment, it is possible to protect the right to request the user to delete the data, and to ensure the reliability of the artificial data used for verifying the behavior of the learned model. Since the reliability of the artificial data is ensured, it is expected that the learned model is appropriately verified.

Various modes of the disclosure derived from the embodiment described above will be described below.

An information processing device according to an aspect of the present disclosure includes: an acquisition unit that acquires information related to artificial data generated by a generative AI constructed by machine learning using user data including information capable of specifying an individual; and a generation unit that generates a transaction including information related to the artificial data. In the above-described embodiment, the acquisition unit 111 corresponds to an example of an acquisition unit, and the generation unit 112 corresponds to an example of a generation unit.

Here, the transaction may include a hash value generated from the artificial data as information about the artificial data. Alternatively, the transaction may include the artificial data as information about the artificial data. The artificial data may be data used for machine-learning of a computational model that differs from the generative AI.

An information processing method according to an aspect of the present disclosure includes: an acquisition step of acquiring information related to artificial data generated by a generative AI constructed by machine learning using user data including information capable of specifying an individual; a generation step of generating a transaction including information related to the artificial data; and a storage step of storing the transaction in a distributed ledger.

The present disclosure is not limited to the above-described embodiments, and can be modified as appropriate within the scope and spirit of the disclosure that can be read from the claims and the entire specification. An information processing device and an information processing method accompanied by such a change are also included in the technical scope of the present disclosure.

What is claimed is:

1. An information processing device comprising:
a processor; and
a non-transitory memory storing a program that causes the processor to:
acquire artificial data and information about the artificial data from a generative artificial intelligence (AI),
the generative AI being built through machine learning using user data,
the user data including facial image data of a user captured by an in- vehicle camera mounted on a vehicle,
the artificial data including facial image data of a fictional person generated by the generative AI based on the facial image data of the user,
the artificial data excluding personally identifiable information that enables personal identification of the user, and
the artificial data being used for training an arithmetic model that is different from the generative AI;
store the artificial data in the memory;
generate a transaction including the information about the artificial data; and
transmit the transaction to a distributed network to cause the transaction to be registered in a distributed ledger.

2. The information processing device according to claim 1, wherein the information about the artificial data includes a hash value generated from the artificial data.

3. The information processing device according to claim 1, wherein the information about the artificial data includes a file name identifying the artificial data.

4. The information processing device according to claim 1, wherein the information about the artificial data includes a Uniform Resource Locator (URL) indicating a location where the artificial data is recorded.

5. The information processing device according to claim 1, wherein the artificial data is generated by the generative AI based on instructions input by an operator of the generative AI.

6. The information processing device according to claim 1, wherein the user data is stored in a database used for training the generative AI and is not stored in the memory.

7. An information processing method comprising:
generating artificial data by a generative artificial intelligence (AI) built through machine learning using user data stored in a database,
the user data including facial image data of a user captured by an in-vehicle camera mounted on a vehicle,
the artificial data including facial image data of a fictional person generated by the generative AI based on the facial image data of the user, and
the artificial data excluding personally identifiable information that enables personal identification of the user;
training an arithmetic model that is different from the generative AI using the generated artificial data;
acquiring the artificial data and information about the artificial data from the generative AI;
storing the artificial data in a memory;
generating a transaction including the information about the artificial data;
transmitting the transaction to a distributed network; and
storing the transaction in a distributed ledger in the distributed network.

8. The information processing method according to claim 7, wherein the information about the artificial data includes a hash value generated from the artificial data.

9. The information processing method according to claim 7, wherein the information about the artificial data includes a file name identifying the artificial data.

10. The information processing method according to claim 7, wherein the information about the artificial data includes a Uniform Resource Locator (URL) indicating a location where the artificial data is recorded.

11. The information processing method according to claim 7, wherein the generation of the artificial data includes generating the artificial data based on instructions input by an operator of the generative AI.

* * * * *